United States Patent [19]

Rood, Jr.

[11] 4,202,157
[45] May 13, 1980

[54] SELECTIVE DOWN COTTON RETRIEVING BELT

[76] Inventor: William E. Rood, Jr., 1195 S. Idaho Rd., Apache Junction, Ariz. 85220

[21] Appl. No.: 941,914

[22] Filed: Sep. 13, 1978

[51] Int. Cl.² ............................................. A01D 45/18
[52] U.S. Cl. ...................................... 56/28; 198/510; 198/654; 198/694
[58] Field of Search .................. 56/28, 49, 328 R; 198/694, 654, 510; 171/63, 61

[56] References Cited
U.S. PATENT DOCUMENTS 3,308,544  3/1967  White .............................. 198/694

FOREIGN PATENT DOCUMENTS 1104693  11/1968  U.S.S.R. ............................... 56/28

Primary Examiner—Jay N. Eskovitz
Attorney, Agent, or Firm—Cahill, Sutton & Thomas

[57] ABSTRACT

A transversely slotted belt for a down cotton retrieving system includes a plurality of spaced, protruding island-like pads disposed along the outer surface of the belt. Each of the protruding pads is substantially bisected by one of the transverse slots, thereby forming separated pairs of opposed flexible fingers. The size, spacing, flexibility, and shape of the pairs of fingers are selected to produce a pinching action which optimizes the grasping efficiency and grasping selectivity of the bisected island-like pads during retrieving of down cotton.

5 Claims, 8 Drawing Figures

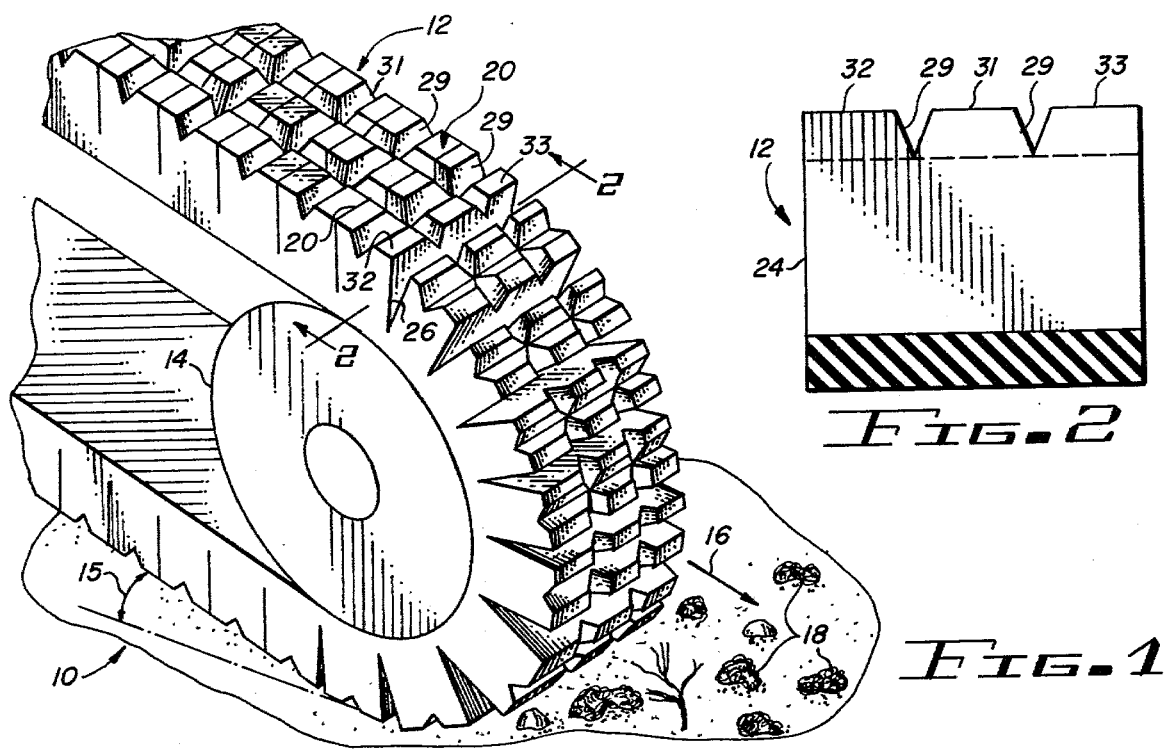
FIG-1
FIG-2
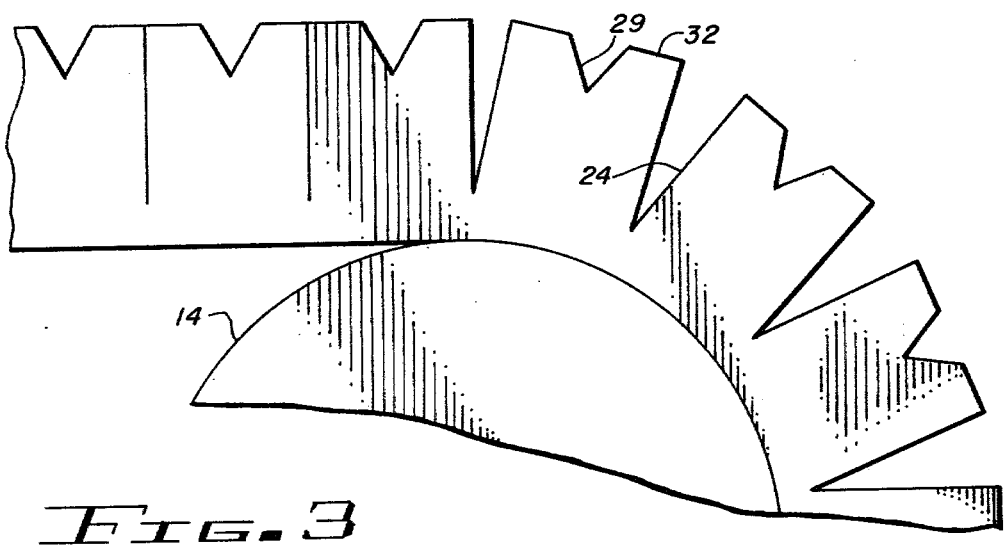
FIG-3
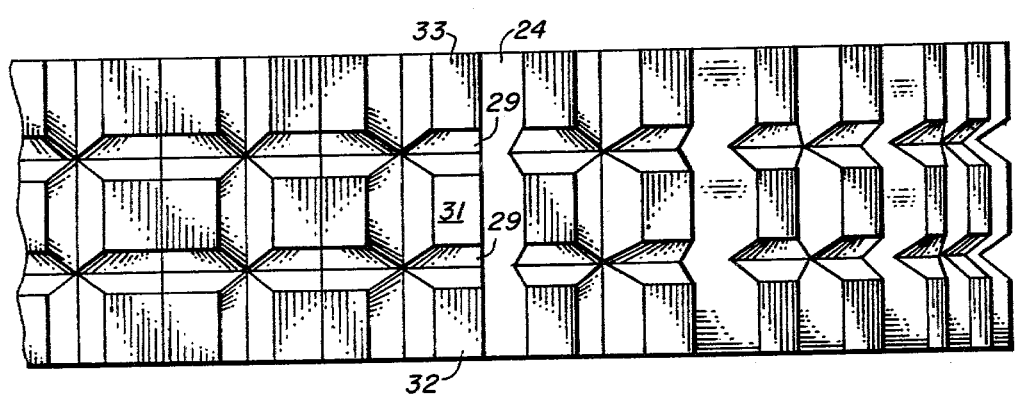
FIG-4

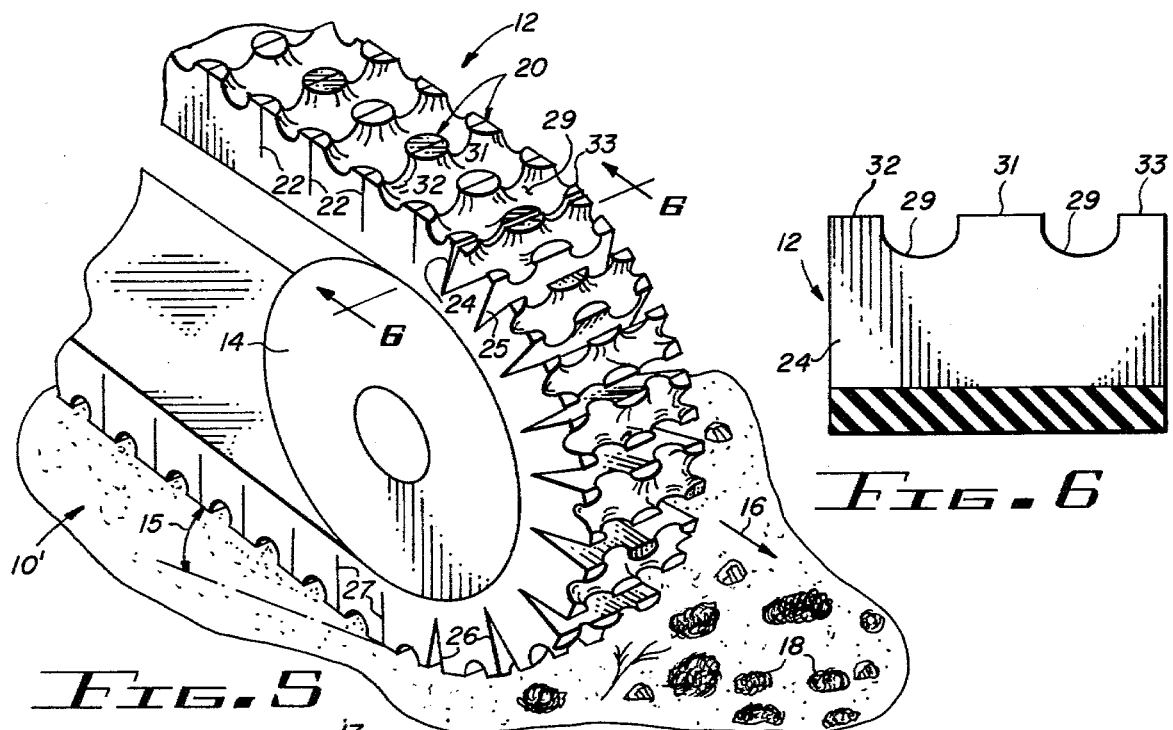
FIG. 5
FIG. 6
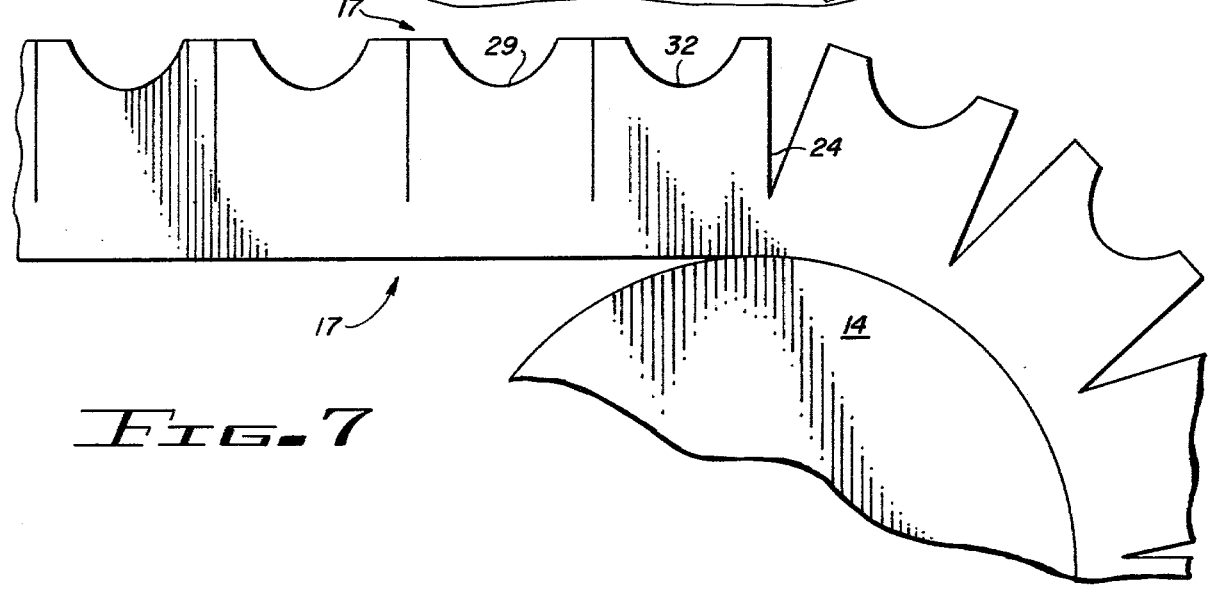
FIG. 7
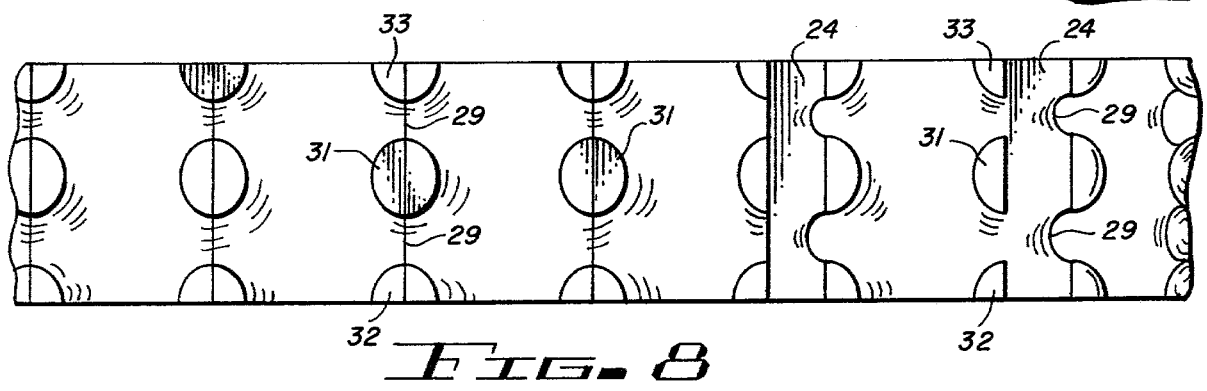
FIG. 8

SELECTIVE DOWN COTTON RETRIEVING BELT

BACKGROUND OF THE INVENTION

1. Field of the Invention

The invention relates to down cotton retrieving systems, and more particularly, to slotted grasping belts for down cotton retrieving systems.

2. Description of the Prior Art

Various machines for gathering "down cotton" are known. Down cotton is cotton which has been knocked down from cotton stalks onto the ground, mainly by adverse weather conditions and mechanical picking machines. The state of the art for such machines, known as cotton gleaners, is indicated by U.S. Pat. Nos. 2,670,584; 3,399,767; 3,164,027; 3,425,097; 3,217,878 and 3,399,518. The cotton gleaners described in the above patents all include transversely slotted retrieving belts. Various techniques are disclosed in the above patents for removing debris picked up along with down cotton by the cotton gleaners. U.S. Pat. No. 3,342,310 discloses a modified retrieving belt having toothed clips extending over the transverse slots to improve the efficiency and selectivity of grasping down cotton; however, this modified retrieving belt has been unsuccessful because it does not adequately release down cotton and other debris picked up from the ground.

Down cotton is frequently embedded in the ground as a result of being run over by cotton picking machines; such down cotton may become further embedded in the ground because of moistness of the ground and subsequent drying and hardening thereof. The down cotton is also frequently partially covered by sticks and stems and other debris which hold the prior art belts up and away from the down cotton and prevent them from grasping the tufts of cotton. Further, the cotton tufts, stems and other material on the ground are of uneven thicknesses, so that when a relatively thick particle is grasped in any area of the transverse slot (in the prior art belts), such relatively thick particle tends to hold the slot open all the way across the width of the belt, thereby preventing the transverse slot from grasping the thin fibers of other tufts of cotton. Although the down cotton retrieving equipment of the prior art is effective, there is nevertheless an unmet need to further improve the efficiency of cotton gleaners by improving the selectivity of their retrieving belts and increasing their ability to simultaneously grasp particles of varying thicknesses and to more selectively grasp down cotton which is embedded in the ground or partially covered by sticks, stones, and other debris.

SUMMARY OF THE INVENTION

Accordingly, it is an object of the invention to provide a slotted retrieving belt which more efficiently grasps down cotton embedded in the ground than prior cotton retrieving belts.

Another object of the present invention is to provide a slotted retrieving belt which more efficiently grasps down cotton partially covered by sticks, stems, and other debris than prior cotton retrieving belts.

Still another object of the present invention is to provide a slotted retrieving belt which more efficiently simultaneously grasps tufts of cotton of uneven thicknesses than prior cotton retrieving belts.

A further object of the present invention is to provide a slotted retrieving belt which selectively grasps down cotton while avoiding grasping of debris.

Briefly described, and in accordance with one embodiment thereof, the invention provides a transversely slotted belt for retrieving down cotton having a plurality of protruding island-like cleats or pads disposed along the outer surface of the belt. Each of the protruding island-like pads is bisected by one of the transverse slots and separated from other of the protruding island-like pads by valley-like gaps, the valley-like gaps being more shallow than the transverse slots. Each of the protruding island-like pads is bisected by one of the transverse grooves to form a separated pair of opposed, individually flexible fingers. The ground-contacting area of the protruding island-like pads, the spacing therebetween, and the size, shape and flexibility of the pairs of fingers are chosen to improve the selectivity and efficiency of grasping tufts of down cotton. In another embodiment of the invention the protruding island-like pads are rectangular, and the valley-like gaps are V-shaped. In one embodiment of the invention, the protruding island-like pads are oval shaped, and the valley-like gaps are rounded. In yet another embodiment of the invention, the protruding pads all the way across the width of the belt and are separated from adjacent protruding pads only by transverse valley-like gaps.

BRIEF DESCRIPTION OF THE DRAWINGS

FIG. 1 is a perspective view of a cotton retrieving system incorporating the present invention.

FIG. 2 is a section view taken along section lines 2—2 of FIG. 1.

FIG. 3 is a side view of a portion of the belt shown in FIG. 1.

FIG. 4 is a top view of a portion of the belt shown in FIG. 1.

FIG. 5 is a perspective view of an alternate embodiment of the cotton retrieving system of the present invention.

FIG. 6 is a section view taken along section lines 6—6 of FIG. 5.

FIG. 7 is a side view of a portion of the belt shown in FIG. 5.

FIG. 8 is a top view of a portion of the belt shown in FIG. 5.

DESCRIPTION OF THE INVENTION

Cotton gleaning machines and cotton retrieving belts for cotton gleaning machines are well known, and are described in U.S. Pat. No. 2,670,584, issued to Rood et al, on Mar. 2, 1954, and U.S. Pat. No. 3,342,310, issued to Gray on Sept. 19, 1967, both incorporated herein by reference to show various details of known cotton gleaning machines and cotton retrieving belts therefore.

Referring now to FIG. 1, a cotton retrieving system 10 includes a flexible cotton retrieving belt 12 which passes over a lower pulley 14. The cotton retrieving system 10 is incorporated in a cotton gleaner (not shown) of the type shown and described in the above referenced patents. Belt 12 includes a plurality of spaced transverse slots such as 22, 24, 25, 26, and 27. As belt 12 approaches the top of pulley 14, belt 12 is in a flat configuration, and transverse slots 22 are closed. As flexible belt 12 passes around pulley 14, the transverse slots open, as illustrated by reference numerals 24 and 25 in FIG. 1. Cotton retrieving belt 12 contacts ground 17 as it passes around the lower portion of pulley 14. At approximately the same time, the transverse slots close upon or grasp tufts of down cotton and are lifted from ground 17. As explained in the above referenced patents, belt 12 is supported by an elevated pulley (not shown in FIG. 1) in addition to pulley 14. Reference numeral 15 in FIG. 1 designates the angle between the lower surface of belt 12 and ground 17. The grasped tufts of down cotton then are transported up to the elevated pulley. The tufts of down cotton are released when the transverse slots open as belt 12 passes around the elevated pulley, as explained in detail in the referenced Rood et al and Gray patents.

Still referring to FIG. 1, down cotton tufts 18 may be somewhat imbedded in ground 17 as a result of being trampled upon, run over by a cotton picking machine, or as a result of rain dampening the ground and subsequent drying and hardening of the ground. The down cotton is also frequently partially covered by sticks, stems and other debris. It should be noted that the cotton tufts, stems and other material lying on the ground are of different thicknesses.

In accordance with one embodiment of the present invention, belt 12 includes a plurality of protruding island-like pads or cleats such as those indicated by reference numeral 20, disposed along the outer surface of belt 12. The various protruding island-like pads are separated by a continuous, contoured, transversely and laterally extending "valley", generally designated by reference numeral 29. As can be readily seen from FIG. 1, the protruding island-like pads are arranged in spaced rows along the outer surface of belt 12. Each of the protruding island-like pads in a particular row is bisected by one of the transverse slots. Continuous valley 29 includes a plurality of shallow (compared to the transverse slots such as 22, 24, 25, etc.) transverse valley-like gaps separating the respective rows of protruding island-like pads. Continuous valley-like gap 29 (shown in FIG. 1) includes two longitudinal grooves separating the respective outer protruding island-like pads of the respective rows from the center protruding island-like pads of the respective rows. It should be noted, however, that the longitudinal grooves are optional in one embodiment of the invention.

The ground contacting surface of the center protruding island-like pad of each row is approximately rectangular when the bisecting transverse slot is closed. Correspondingly, the first and third protruding island-like pads of each row also have a rectangular shaped ground-contacting surface when the bisecting transverse slot is closed.

In one embodiment of the invention, the contoured valley 29 is approximately 3/16 to ¼ of an inch deep. The major axis of the oval shaped pads is approximately ½ inch in length, and the minor axis is approximately 7/16 of an inch in length. The longitudinal center-to-center spacings of the pads along the flat portion of belt 12 are approximately 1 inch. The widths of the longitudinal groove portions of valley 29 as shown in FIG. 2 are approximately ⅜ of an inch. The widths of the transverse groove portions of valley 29 are approximately ½ inch. The width of belt 12 is approximately 2 inches. FIG. 3 clearly illustrates the transverse groove portions of valley 29.

According to the present invention, the above dimensions of the protruding island-like shaped pads and the spacing therebetween are selected to provide reduced contact area between the ground and the pads, thereby increasing the pad pressure per unit area. The outer surface of the various pads therefore tend to penetrate the surface of ground 17, thereby enabling the pads to grasp more fibers of a tuft of down cotton, which may be embedded in the soil for the previously mentioned reasons. The protruding island-like bisected pads allow the pair of opposed fingers formed by each of the pads to reach down, inbetween and around sticks, stems and other debris that may partially cover the down cotton, as previously described, in order to more efficiently grasp the tufts of cotton lying beneath. The relief provided by the transverse valley-like gaps between each of the rows of protruding island-like bisected pads allows the pairs of opposed fingers formed by the pads to be individually flexible, thereby enabling one of the pairs of opposed fingers forming one of the protruding pads to firmly grasp the thin fibers of one tuft of cotton while another pair of the opposed flexible fingers forming another protruding island-like pad along the same slot is grasping a thicker portion or particle. The small ground-contacting area of the bisected protruding island-like pads results in improved selectivity in grasping down cotton tufts and less likelihood of picking up leaves, twigs, and the like. The spacing of the island-like pads is sufficiently close that an average sized tuft of down cotton is very likely to be grasped by an island-like pad portion of one of the transverse slots as it closes upon contact with the ground.

The increased penetration of the grasping island-like pad portions of the transverse slots increases the amount of down cotton which can be retrieved, compared to prior down cotton retrieving belts. The reduced amount of belt area actually contacting the ground increases the selectivity by rejecting twigs and other debris, producing a cleaner, higher grade cotton. Thus, the "cleated" down cotton retrieving belts of the present invention can be utilized as replacement belts for cotton gleaning machines utilizing prior down cotton retrieving belts, thereby increasing the overall efficiency and profitability of cotton farming and harvesting operations at a very low cost.

An alternate configuration of the island-like pads or cleats of the invention is shown in FIGS. 5-8. The corresponding parts are similar to those of FIG. 1, except that the transverse and longitudinal slots constituting valley 29 are essentially V-shaped, and the pad surfaces are substantially rectangular. The reference numerals utilized in FIG. 1 are again utilized in FIG. 5 to designate corresponding parts. The operation and advantages are essentially the same for both embodiments of the invention.

It may be seen that the cotton retrieving belt of the invention provides a means for cotton retrieving gleaners to more selectively discriminate between cotton and other debris lying on the ground and more firmly grasp tufts and fibers of down cotton sticking to or embedded in the ground and to more efficiently grasp tufts of down cotton that are covered by sticks, stems and debris, and to simultaneously grasp particles of different thicknesses. The increased selectivity and firmer grasping enables cotton gleaners to produce more and cleaner cotton than would normally be expected of present down cotton retrieving belts.

It will be obvious to those skilled in the art that various modifications may be made in the shape and arrangement of the bisected protruding island-like pads of the invention without departing from the spirit and scope of the present invention. Therefore, it is intended that the present invention be limited only by scope of the claims appended hereto.

I claim:

1. A flexible cotton retrieving belt for use in a cotton retrieving system including an upper pulley and a lower pulley for supporting said belt, said belt comprising in combination:
   a. a plurality of transverse slots disposed in spaced relationship along the outer surface of said belt for opening when said belt is flexed as said belt passes over said pulleys and closing when said belt straightens as said transverse slots move away from said pulleys; and
   b. a plurality of island-like pads disposed along the outer surface of said belt, each of said island-like pads being substantially bisected by one of said transverse slots and separated from the others of said island-like pads by shallow valley-like gaps;
   whereby, said island-like pads selectively close upon and grasp tufts and/or fibers of down cotton on or embedded in the ground as said belt passes around and away from said lower pulley.

2. The cotton retrieving belt of claim 1 wherein the ground-contacting surfaces of said island-like pads are substantially oval shaped.

3. The cotton retrieving belt of claim 1 wherein the ground-contacting surfaces of said island-like pads are substantially rectangular.

4. The cotton retrieving belt of claim 2 wherein said valley-like gaps are substantially rounded.

5. The cotton retrieving belt of claim 3 wherein said valley-like gaps are substantially V-shaped.

* * * * *